(12) United States Patent
Lanjewar et al.

(10) Patent No.: US 8,135,746 B2
(45) Date of Patent: Mar. 13, 2012

(54) MANAGEMENT OF SYMBOLIC LINKS

(75) Inventors: Ujjwal Lanjewar, Maharashtra (IN); Chanda Sethia, Karnataka (IN); Yogesh Golwalkar, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 12/182,276

(22) Filed: Jul. 30, 2008

(65) Prior Publication Data

US 2010/0030739 A1 Feb. 4, 2010

(51) Int. Cl.
*G06F 17/30* (2006.01)
(52) U.S. Cl. ............... 707/791; 707/802; 707/803
(58) Field of Classification Search ............ 707/791, 707/802–803
See application file for complete search history.

(56) References Cited

U.S. PATENT DOCUMENTS

| | | | |
|---|---|---|---|
| 5,634,048 A * | 5/1997 | Ryu et al. .................. | 1/1 |
| 5,832,527 A * | 11/1998 | Kawaguchi ............... | 1/1 |
| 6,327,703 B1 | 12/2001 | O'Donnell et al. | |
| 6,775,672 B2 | 8/2004 | Mahalingam et al. | |
| 6,947,940 B2 | 9/2005 | Anderson et al. | |
| 7,010,553 B2 | 3/2006 | Chen et al. | |
| 7,010,554 B2 * | 3/2006 | Jiang et al. ............... | 1/1 |
| 7,340,444 B2 | 3/2008 | Hipp | |
| 7,457,822 B1 * | 11/2008 | Barrall et al. ............. | 1/1 |
| 7,809,779 B2 * | 10/2010 | Ahn et al. ................ | 707/828 |
| 2003/0158873 A1 * | 8/2003 | Sawdon et al. .......... | 707/204 |
| 2006/0253502 A1 * | 11/2006 | Raman et al. ............ | 707/202 |
| 2007/0162419 A1 * | 7/2007 | Ahn et al. ................ | 707/1 |

* cited by examiner

*Primary Examiner* — Frantz Coby

(74) *Attorney, Agent, or Firm* — James L. Baudino; Matthew B. Talpis

(57) ABSTRACT

Disclosed is a method of creating a symbolic link in a source file system to a target file in a target file system, the method including querying the target file system for an identifier of the target file; incrementing a reference counter of the target file, the reference counter indicating how many symbolic links the target file is a target of; and creating the symbolic link in the source file system, the symbolic link including the identifier received from the target file system in response to the query.

6 Claims, 6 Drawing Sheets

MANAGEMENT OF SYMBOLIC LINKS

FIELD OF THE INVENTION

The present invention relates generally to file systems for storing electronic data and, in particular, to a method, system and computer program product for management of symbolic links within such file systems.

SUMMARY OF THE INVENTION

In a file system for storing files containing electronic data, a symbolic link (also known as a soft link or symlink) is a special type of file that contains a reference to another file or directory (the target file). Symbolic links operate transparently, in that processes which operate on a symbolic link will behave as if operating directly on the target file. The target file can be in a different file system from the symbolic link.

Under the Unix™ operating system, a symbolic link is a file in its own right and can exist independently of its target. A symbolic link merely contains a text string that is interpreted and followed by the operating system as a path to another file or directory. If a symbolic link is deleted, its target remains unaffected. If the target is moved, renamed or deleted, any symbolic link that is used to point to it continues to exist but now points to a non-existing file. Symbolic links pointing to non-existing files are sometimes called orphaned or stale. Some operating systems with features similar to symbolic links are able to handle movement of the target within the same file system, so that the link does not become stale as a result of the move, but cannot handle movement to a different file system.

It may happen that the target of a symbolic link is "replaced" by another file with the same name and path but different content. For example, this can be achieved in the Unix™ operating system by a "mv" (move) command giving the original target file some other name and/or path, followed by a second "mv" command giving some other file the name and path of the original target file. In such a situation, the symbolic link is not stale, but points to a file that is different from the original target of the link. This can cause unexpected results.

Arrangements disclosed herein can supplement Unix™-style symbolic links with 'metadata' at both the symbolic link (source) and target files. The metadata is created, read, and maintained by interacting processes at the source and target file systems when a symbolic link is created, accessed, or deleted, or a target file is moved, renamed, replaced, or deleted. The user can set and alter parameters affecting how the metadata is created and maintained. The resulting system of management of symbolic links provides greater robustness to these operations on the target file. In particular, the management system disclosed herein can handle the movement of the target file within the same file system or to a new file system.

According to a first aspect of the present invention, there is provided a method of creating a symbolic link in a source file system to a target file in a target file system, the method including querying the target file system for an identifier of the target file; incrementing a reference counter of the target file, the reference counter indicating how many symbolic links the target file is a target of; and creating the symbolic link in the source file system, the symbolic link including the identifier received from the target file system in response to the query.

According to a second aspect of the present invention, there is provided a method of deleting a symbolic link in a source file system to a target file in a target file system, the method including decrementing a reference counter of the target file, the reference counter indicating how many symbolic links the target file is a target of; and deleting the symbolic link from the source file system.

According to a third aspect of the present invention, there is provided a method of accessing a target file in a target file system through a symbolic link in a source file system, the method including querying the target file system utilizing an identifier of the target file; determining whether the target file has been replaced by a new file; updating, if the target file has been replaced with a new file, the symbolic link with an identifier for the new file; and accessing the target file using the identifier for the new file.

According to a fourth aspect of the present invention, there is provided a method of performing an operation on a file that is a target of a symbolic link, the method including storing, in association with the target file, a timestamp at which the operation was invoked; performing the operation on the target file; and storing, in association with the target file, if a new file appeared at the path of the target file, a time difference between the stored timestamp and a timestamp at which a new file appeared at the path of the target file.

According to a further aspect of the present invention, there is provided a system for managing symbolic links, the system including one or more source file systems, each source file system containing one or more symbolic links; one or more target file systems, each target file system containing a target file that is a target of at least one symbolic link, wherein each target file has a reference counter indicating how many symbolic links the target file is a target of.

According to yet a further aspect of the present invention, there is provided a computer readable medium having recorded thereon a computer program for implementing any one of the methods described above.

Other aspects of the invention are also disclosed.

BRIEF DESCRIPTION OF THE DRAWINGS

One or more embodiments of the present invention will now be described with reference to the following drawings, in which.

DETAILED DESCRIPTION

Figure 1:
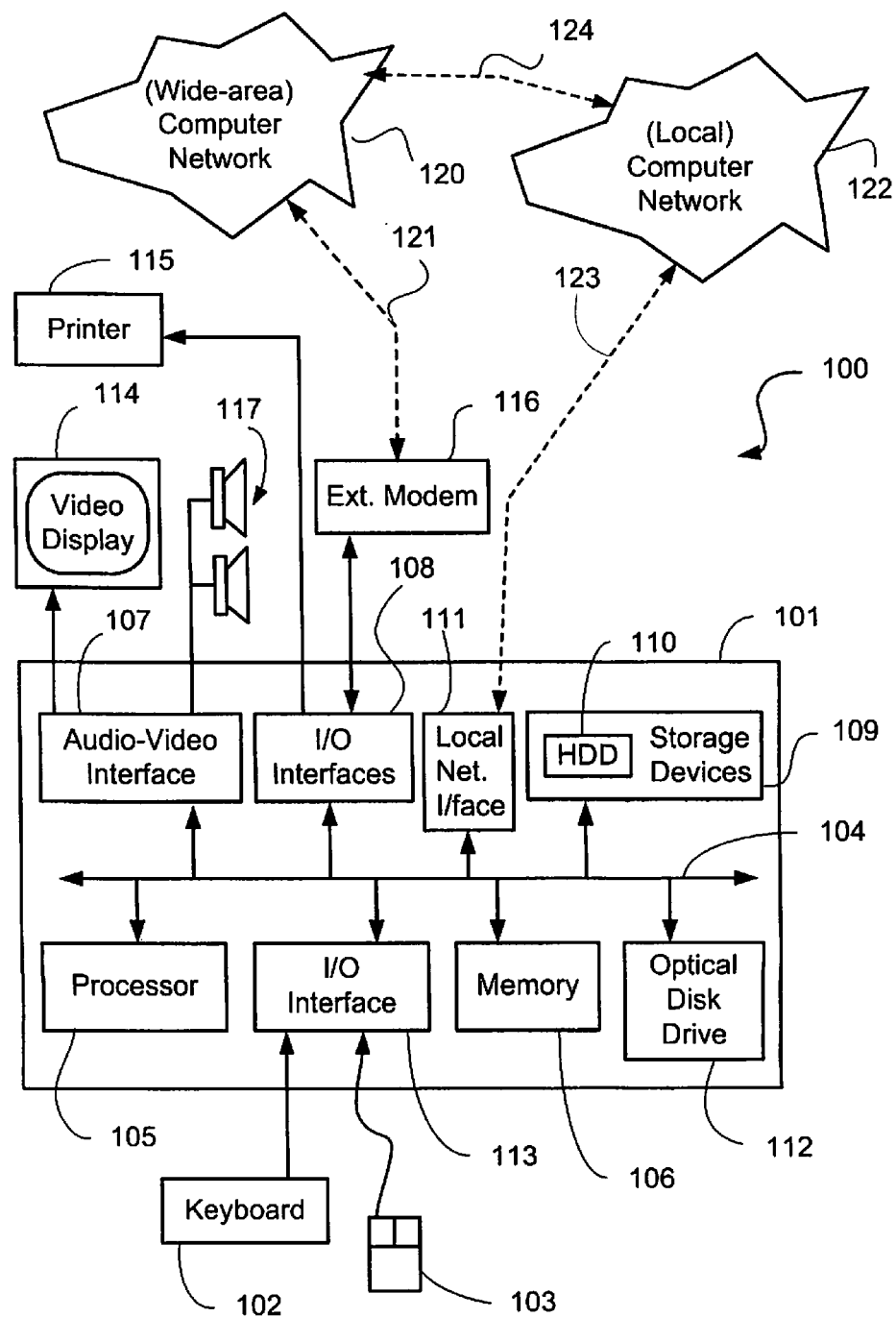
FIG. 1 is a schematic block diagram of a general purpose computer upon which the embodiments described may be practiced.

Where reference is made in any one or more of the accompanying drawings to steps and/or features, which have the same reference numerals, those steps and/or features have for the purposes of this description the same function(s) or operation(s), unless the contrary intention appears.

The following definitions are used throughout this disclosure:

File UUID

Both source and target file systems generate and use Universally Unique Identifiers (UUIDs) to identify their respective files. The UUID of a file is unique across file systems. Most conventional file systems operate in this manner, using different names for the same concept.

File Inode

When a file system is created, data structures called inodes that contain information about files are created in the file system. Each file in the file system has an inode that is accessed via the UUID of the file.

Described below are methods for creating symbolic links, performing operations on the link target such as moving, deletion, and replacement, and accessing the target through the symbolic link. The described methods include steps that operate on both the symbolic link (source) and target file systems, and can be implemented utilizing separate symbolic link management processes operating on each file system, interacting by passing messages and variables between them. Note that the source and target file systems can be the same.

Each symbolic link management process can be implemented utilizing a computer system 100, such as that shown in FIG. 1. In particular, the steps of each process are implemented by software instructions that are carried out within the computer system 100. The software instructions can be formed as one or more code modules, each for performing one or more particular tasks. The software instructions (hereinafter also referred to as software) can also be divided into two separate parts, in which a first part and the corresponding code modules perform the process steps and a second part and the corresponding code modules manage a user interface between the first part and the user. For example, the software can be stored in a computer readable medium, including the storage devices described below. The software is loaded into the computer system 100 from the computer readable medium, and then executed by the computer system 100. A computer readable medium having such software or computer program recorded on it is a computer program product. The computer program product in each computer system 100 implements an advantageous system for management of symbolic links.

As seen in FIG. 1, the computer system 100 is formed by a computer module 101, input devices such as a keyboard 102 and a mouse pointer device 103, and output devices including a printer 115, a display device 114 and loudspeakers 117. An external Modulator-Demodulator (Modem) transceiver device 116 can be used by the computer module 101 for communicating to and from a communications network 120 via a connection 121. Through the network 120, the computer system 100 interacts with other like computer systems. The network 120 can be a wide-area network (WAN), such as the Internet or a private WAN. Where the connection 121 is a telephone line, the modem 116 can be a traditional "dial-up" modem. Alternatively, where the connection 121 is a high capacity (e.g., cable) connection, the modem 116 can be a broadband modem. A wireless modem can also be used for wireless connection to the network 120.

The computer module 101 can include at least one processor unit 105, and a memory unit 106 for example formed from semiconductor random access memory (RAM) and read only memory (ROM). The module 101 also includes a number of input/output (I/O) interfaces including an audio-video interface 107 that couples to the video display 114 and loudspeakers 117, an I/O interface 113 for the keyboard 102 and mouse 103, and an interface 108 for the external modem 116 and printer 115. In some implementations, the modem 116 can be incorporated within the computer module 101, for example within the interface 108. The computer module 101 also has a local network interface 111 that, via a connection 123, permits coupling of the computer system 100 to a local computer network 122, known as a Local Area Network (LAN). As also illustrated, the local network 122 can also couple to the wide network 120 via a connection 124, that can include a so-called "firewall" device or similar functionality. The interface 111 can be formed by an Ethernet™ circuit card, a wireless Bluetooth™ or an IEEE 802.11 wireless arrangement.

The interfaces 108 and 113 can afford both serial and parallel connectivity, the former, for example, being implemented according to the Universal Serial Bus (USB) standards and having corresponding USB connectors (not illustrated). Storage devices 109 are provided and can include a hard disk drive (HDD) 110. Other devices such as a floppy disk drive and a magnetic tape drive (not illustrated) can also be used. An optical disk drive 112 can be provided to act as a non-volatile source of data. Portable memory devices, such as optical disks (e.g., CD-ROM, DVD), USB-RAM, and floppy disks for example can be used as appropriate sources of data to the computer system 100. Such storage devices and other sources of data are separately 'mounted' under a single file system for the computer system 100 under a Unix™-style operating system. A single file system can span data sources on multiple computer systems 100.

The components 105, 106, 107, 108, 109, 110, 111, 112, and 113 of the computer module 101 can communicate via an interconnected bus 104. Examples of computers on which the described arrangements can be utilized include IBM-PCs and compatibles, Sun Sparcstations, Apple Mac™ or like computer systems evolved therefrom.

The symbolic link management processes discussed above can be resident on the hard disk drive 110 and read and controlled in execution by the processor 105. Intermediate storage of such programs and any data fetched from the networks 120 and 122 may be accomplished using the semiconductor memory 106, possibly in concert with the hard disk drive 110. In some instances, the processes may be supplied to the user encoded on one or more CD-ROM and read via the corresponding drive 112, or alternatively may be read by the user from the networks 120 or 122. Still further, the software can also be loaded into the computer system 100 from other computer readable media. Computer readable media refers to any storage medium that participates in providing instructions and/or data to the computer system 100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the symbolic link management processes and the corresponding code modules mentioned above may be executed to implement one or more graphical user interfaces (GUIs) to be rendered or otherwise represented upon the display 114. Through manipulation of the keyboard 102 and the mouse 103, a user of the computer system 100 can manipulate the interface to provide controlling commands and/or input to the processes associated with the GUI(s).

Figure 2:
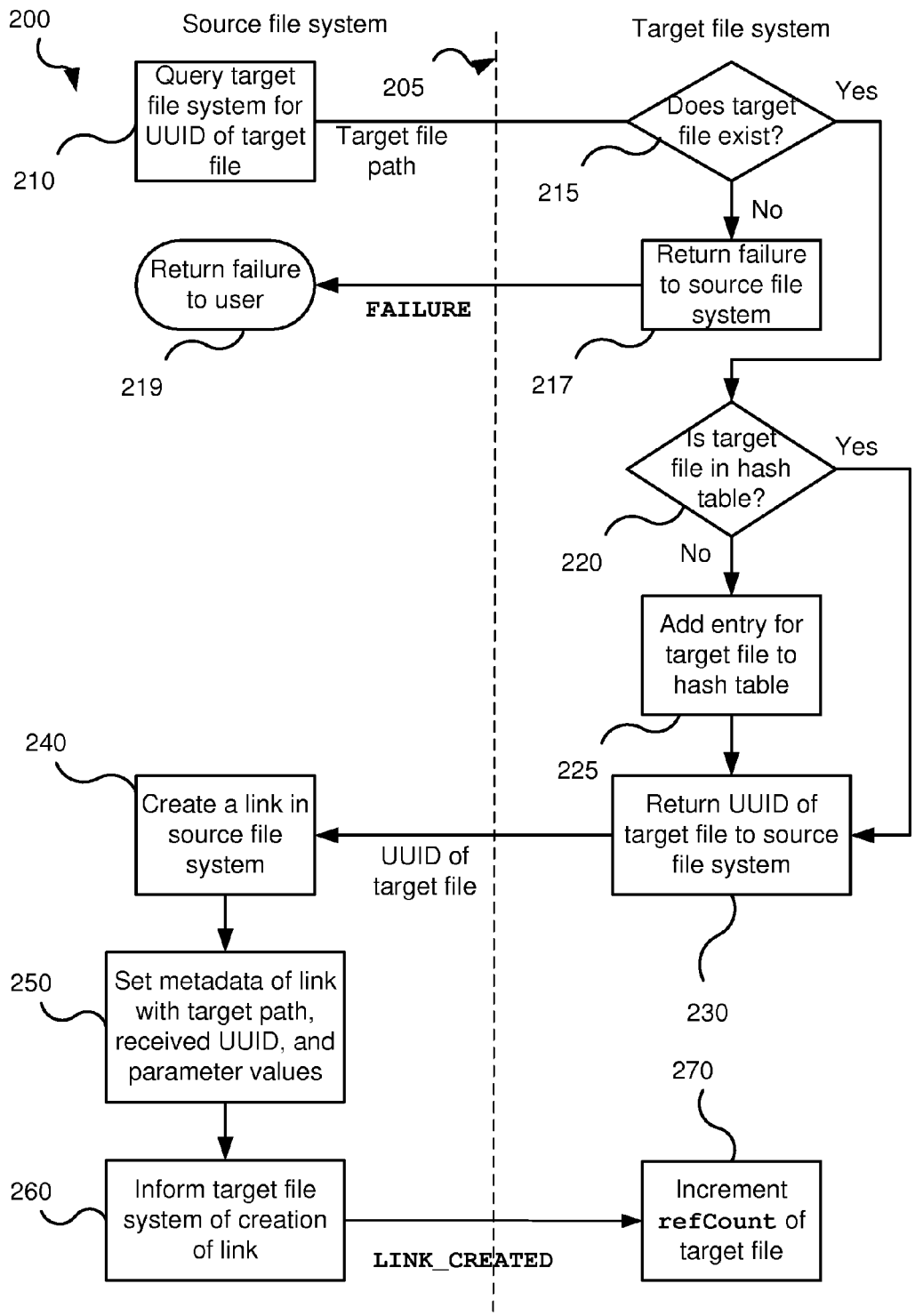
FIG. 2 is a flow diagram illustrating a method of creating a symbolic link according to at least one embodiment of the present invention.

FIG. 2 is a flow diagram illustrating a method 200 of creating a symbolic link according to at least one embodiment of the present invention. The method 200, like the other methods 400 and 500 described below, operates on both the source and target file systems, as indicated by the dividing line 205 separating the steps operating on the source file system from the steps operating on the target file system. The steps on the left of the dividing line 205 are part of a symbolic link management process that is implemented on the computer system (e.g. 100) that is associated with the source file system, and is referred to hereafter as the source process, while the steps on the right of the dividing line 205 are part of a symbolic link management process that is implemented on the computer system (e.g. 100) that is associated with the target file system, and is referred to hereafter as the target process.

On invocation by a user, the method 200 is passed several parameters: the name and path of the source symbolic link file (assumed to be on the source file system); the file system and absolute path of the target file; a real variable "delay;" a Boolean variable "deleteLink;" and a Boolean variable "preferName." The function of the three variable parameters will be described below. If values for any of the three variable parameters are not specified by the user in invoking the method 200, they assume default values for the source file system. The default value for "delay" is 0, for "deleteLink" is TRUE, and for "preferName" is TRUE (indicating that file name will be preferred to UUID for tracking purposes). However, these default values for the file system are configurable and hence an administrator would be able to set the default values as per his/her requirements.

The method 200 starts at step 210, in which the source process queries the target file system for the UUID of the file on the target file system with path equal to the target file path. If the target file system is not available, the method 200 either returns a failure to the user, or uses a queue mechanism to store the query for when the target file system becomes available.

In step 215, the target process determines whether a file exists at the target file path. If not, at step 217 the target process returns a failure message to the source process, that at step 219 passes the failure message back to the user. If so, at step 220, after determining the UUID of the file at the target file path, the target process determines whether the target file is in a hash table that is maintained at the target file system by the target process. The hash table contains an entry for each file in the target file system that is the target of a symbolic link. Each entry is indexed by the UUID of the target file and contains a pointer to the inode of the target file. Step 220 therefore checks the hash table to see if it contains an entry with the UUID of the target file. If not, the target process in step 225 adds a new entry to the hash table using the UUID of the target file. If so, or following step 225, the target process in step 230 returns the UUID of the target file to the source process. In the next step 240, the source process creates a symbolic link in the source file system. This involves creating a source file whose inode indicates that it is a symbolic link. Step 250 follows, in which the inode of the source file is supplemented with "metadata" including the UUID of the target file, the file system and path of the target file, and the three variable parameter values "delay," "deleteLink," and "preferName" described above. In step 260, the source process informs the target process that the symbolic link has been successfully created by passing a message "LINK_CREATED." Finally, at step 270, in response to receipt of the "LINK_CREATED" message, the target process increments a counter called "refCount" in the metadata contained in the inode of the target file. This counter, which is initialised at 0 for a new file, indicates how many symbolic links point to the file.

Figure 3:
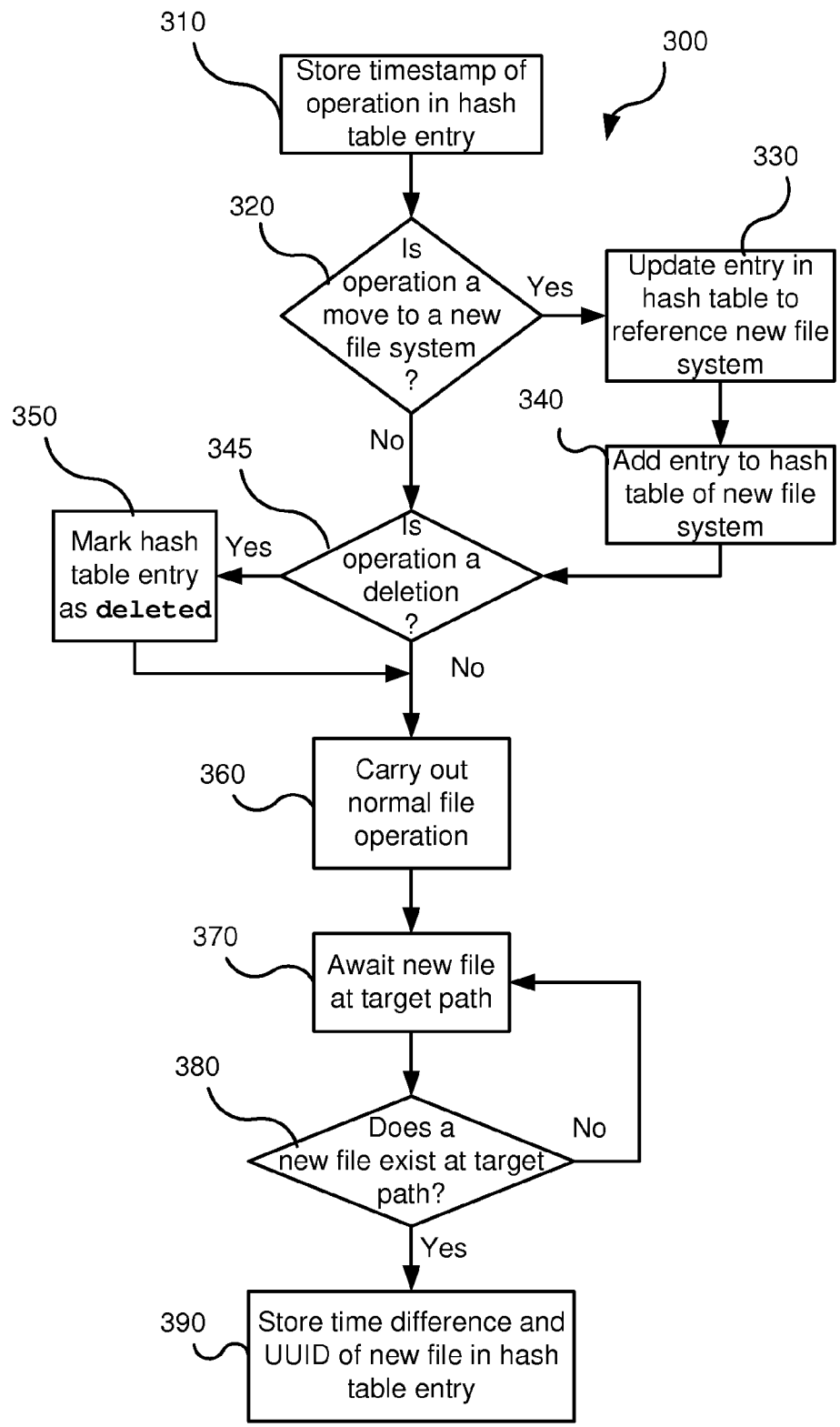
FIG. 3 is a flow diagram illustrating a method of handling an operation on a target file according to at least one embodiment of the present invention.

FIG. 3 is a flow diagram illustrating a method 300 of handling an operation on a target file according to at least one embodiment of the present invention. The operation can be a moving, renaming, replacement, or deletion of the target file. In Unix™-like operating systems, movement and renaming are both implemented using the same command, namely "mv", and are therefore both referred to in what follows under the single term "move". As mentioned above, "replacement" means that a new file acquires the name and path of the original target file, for example by two sequential move operations on the target file system.

The method 300, carried out by the target process, starts at step 310 when the user initiates an operation on a file that is the target of a symbolic link in the target file system, for example by means of the Unix™ command "mv". At step 310, the target process stores a timestamp for the operation in the target file's hash table entry. In the next step 320, the target process checks whether the operation is a move to a new file system. If not, the method 300 proceeds to step 345. If so, the target process at step 330 updates the corresponding entry in the hash table to reference the new file system. Then at step 340, a new entry in the hash table of the new file system is added corresponding to the file to be moved. The new entry references the inode of the file in the new file system. Step 345 follows, at which the target process checks whether the operation is a deletion. If not, the method 300 continues at step 360. If so, the target process at step 350 marks the hash table entry as "deleted." The method 300 then proceeds to step 360.

At step 360, the operation on the target file is carried out by the target process as normal. At the next step 370, the target process awaits a new file at the original target path. If a new file appears at the target path ("Yes" at the checking step 380), the target process subtracts the timestamp stored in the hash table entry at step 310 from the timestamp at which the new file appeared at the target path. The result is a time difference, which is stored in the hash table entry at step 390. Also at step 390, the target process stores the UUID of the new file in the hash table entry. The method 300 then concludes.

It is noted that deletion of a target file does not result in instant removal of the corresponding hash table entry. Entries in the hash table can be removed by a background process at the target file system. The background process will look for target files that are marked as "deleted" (see step 350) and have not been replaced after a time interval, as indicated by the absence of a stored time difference in the hash table entry (see step 390). The length of the interval is configurable for the target file system. Note also that after the method 300, the source file system has not yet been informed of the change in the target file system as a result of the operation on the target file.

Figure 4:
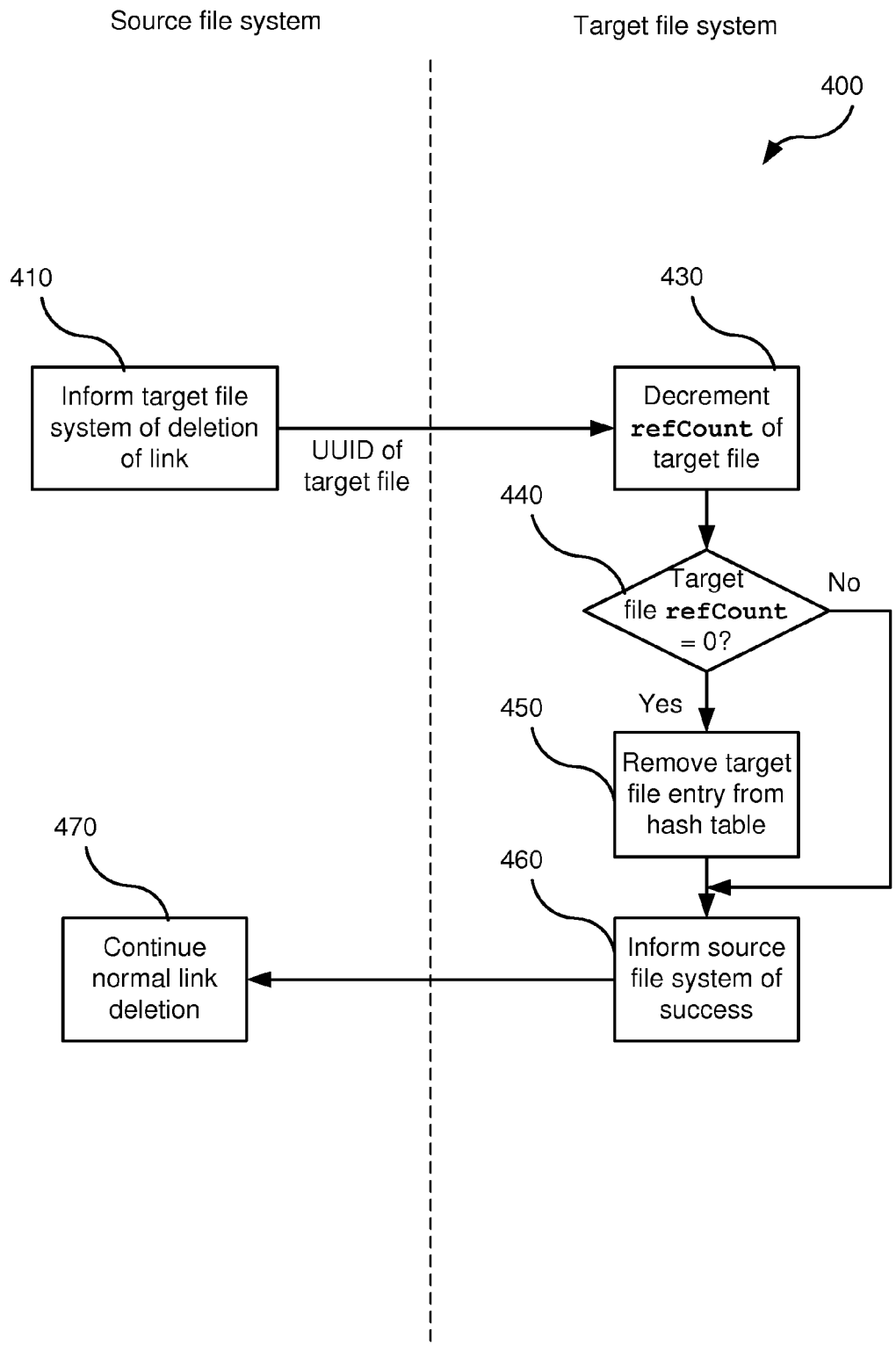
FIG. 4 is a flow diagram illustrating a method of handling deletion of a symbolic link from the source file system according to at least one embodiment of the present invention.

FIG. 4 is a flow diagram illustrating a method 400 of handling deletion of a symbolic link from the source file system according to one embodiment of the present invention. The method 400 starts at step 410 when a user initiates the deletion of the symbolic link from the source file system, for example by means of the Unix™ command "rm" (remove/delete). The source process informs the target file system of the deletion of the symbolic link, passing the UUID of the target file obtained from the inode metadata of the symbolic link to be deleted (see step 250). In the next step 430, the target process decrements the value of "refCount" in the inode metadata of the target file, identified via the received UUID. Step 440 then determines whether the value of "refCount" has reached zero. If not, method 400 proceeds to step 460. If so, the target process at step 450 removes the entry corresponding to the target file from the hash table, since there are no remaining symbolic links referencing the target file. At the next step 460, the target process informs the source file system of the successful completion of the target file system part of the deletion, after which, at step 470, the normal deletion of the symbolic link file continues.

Figure 5A:
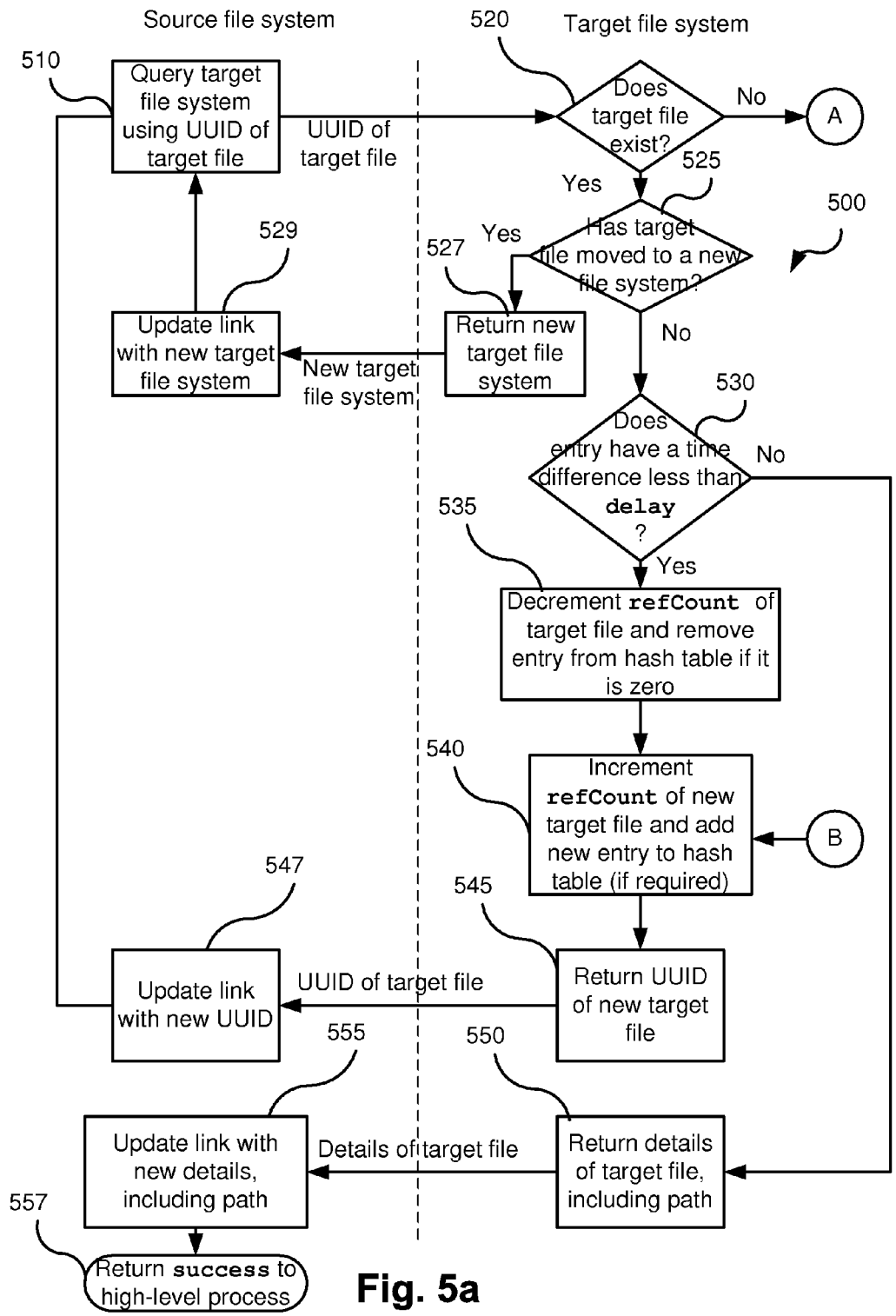
FIGS. 5a and 5b are a flow diagram illustrating a method of accessing a target file through a symbolic link created utilizing the method of FIG. 2.
Figure 5B:
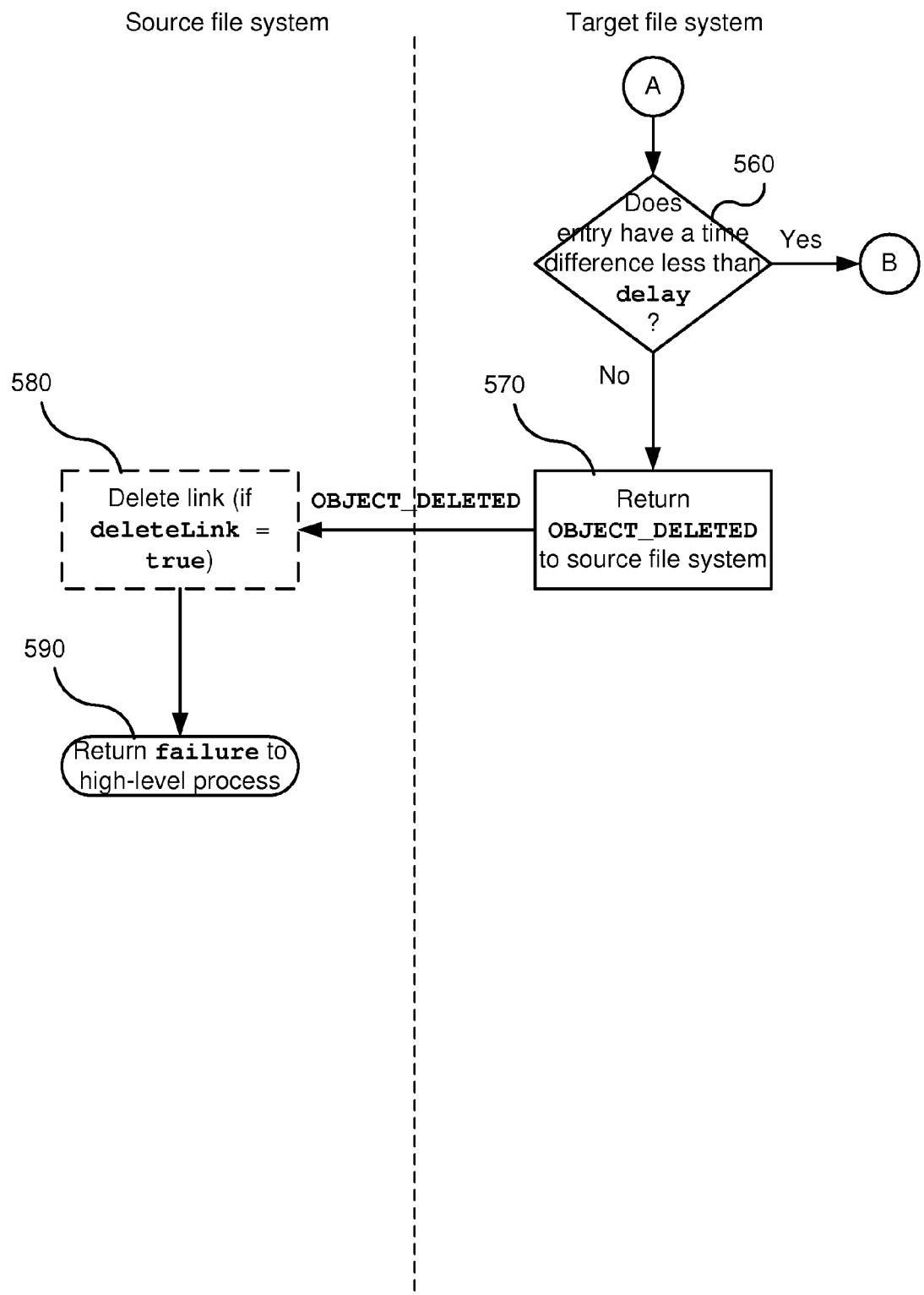

FIGS. 5a and 5b are a flow diagram illustrating a method 500 of accessing a target file through a symbolic link. The access is carried out by a high-level process executing on the source computer system, for example the Unix™ command "cat" which writes out the content of a file to the display. The method 500 is only carried out if the symbolic link has the parameter value "preferName" set to "false," indicating that the system should access the symbolic link through the UUID of the target file. Otherwise, the symbolic link can be accessed according to conventional methods.

The method 500 starts at step 510 where the source process queries the target file system using the UUID of the target file obtained from the inode metadata of the symbolic link. At step 520, the target process determines whether the target file, identified from the received UUID, exists in the target file system by checking whether a corresponding entry exists in the hash table, and if so whether it is not marked as "deleted." If not, the target file has been deleted, and the method 500 proceeds to step 560 through "A" (sec FIG. 5b). If so, the target process at step 525 checks whether the target file has been moved to a new file system, that will be indicated by the corresponding entry in the hash table containing a reference to the new file system rather than a pointer to an inode (see step 340). If so, the target process in step 527 returns the reference to the new file system to the source process, which at step 529 updates the link inode metadata with the received file system reference and returns to step 510 to re-submit the query.

If the target file has not been moved to a new file system, the target process at step 530 checks whether the hash table entry has a time difference, indicating the target file has been replaced with a new file at the same path, and whether the time difference is less than the value of the parameter "delay" for the symbolic link, which was passed to the target process along with the UUID in step 510. If so, the method 500 proceeds to step 535; otherwise, although the target file may have been moved within the same file system, no replacement file appeared in time at the original path, so the method 500 proceeds to step 550.

At step 535, the target process decrements the value of "refCount" in the inode metadata of the replaced target file, and checks whether the new value of "refCount" is 0, in which case the target process removes the corresponding entry from the hash table. Then at step 540, the target process increments "refCount" in the inode metadata of the new target file. If the new target file did not already have a corresponding entry in the hash table, then one is added using the UUID of the new target file obtained from the hash table entry of the original target file (see step 390). At step 545, the new UUID is returned by the target process to the source process, which at step 547 updates the link inode metadata with the received UUID, thus completing the transfer of the symbolic link from the replaced target file to the new target file. The method 500 then returns to step 510 to re-submit the query with the new UUID.

At step 560 (FIG. 5b), which is reached if the target file has been deleted, the target process checks whether the hash table entry has a time difference, indicating the deleted target file has been replaced with a new file at the same path, and whether the time difference is less than the value of the parameter "delay" for the symbolic link, which was passed to the target process along with the UUID in step 510. If so, the method 500 proceeds to step 540 (through "B") described above; otherwise, no replacement file appeared in time at the original path, so the method 500 proceeds to step 570 at which the target process returns an "OBJECT_DELETED" message to the source file system indicating that the target file has been deleted. The source process at step 580, which is carried out only if the symbolic link inode metadata has the Boolean value "deleteLink" set to "true," deletes the symbolic link, as in step 470. Finally, at step 590 the source process returns an error message to the high-level process accessing the symbolic link. The method 500 then concludes.

At step 550, the target process returns the details of the target file to the source file system, including the path, which will have changed if the target file has been moved without being replaced in time. The source process then at step 555 updates the inode metadata of the symbolic link with the received details, including the path. Finally at step 557 the source process returns a "success" message to the high-level process, allowing the high-level process to execute using the updated symbolic link details. The method 500 then concludes.

The foregoing describes only some embodiments of the present invention, and modifications and/or changes can be made thereto without departing from the scope and spirit of the invention, the embodiments being illustrative and not restrictive.

We claim:

1. A method of creating a symbolic link in a source file system to a target file in a target file system, the method comprising:
    receiving, by a source file system, an absolute path for a target file in a target file system;
    querying the target file system to determine an identifier of a file in the target file system with a path equal to the absolute path;
    responsive to determining the identifier of the file in the target system with a path equal to the absolute path, notifying the source file system of the identifier;
    creating the symbolic link in the source file system; and
    creating an inode in the source file system corresponding to the symbolic link, the inode having metadata including the identifier and a delay parameter value, the delay parameter value useable to determine whether the target file in the target file system has been replaced with a new file at the absolute path.

2. The method of claim 1, further comprising:
    responsive to receiving by the target file system an indication that the symbolic link has been created in the source file system, incrementing a counter in an inode in the target file system corresponding to the target file, the counter indicating a number of symbolic links the target file is a target of.

3. A method of accessing a target file in a target file system through a symbolic link in a source file system, the method comprising:
    querying the target file system utilizing an identifier of the target file, the target file belonging to the target file system at a target file path;
    determining whether an entry exists for the target file in a table of the target file system based on the identifier, the entry indicating that the target file is a target of a symbolic link;
    responsive to determining that the table contains an entry for the target file, determining whether the entry indicates a time difference;

responsive to determining that the entry indicates a time difference, comparing the time difference to a delay parameter value for the symbolic link, the delay parameter value received from the source file system; and responsive to determining that the time difference is greater than the delay parameter value, returning a new file path to the source file system of the target file.

4. The method of claim 3, wherein, responsive to determining that the time difference is less than the delay parameter value:

determining that the target file has been replaced by a new file at the target path; and returning an identifier of the new file to the source file system.

5. The method of claim 4, further comprising:

decrementing a counter corresponding to the target file; and incrementing a counter corresponding to the new file, wherein the respective counters indicate a quantity of symbolic links the target file and the new file are a target of.

6. The method of claim 4, further comprising updating an inode corresponding to the symbolic link in the source file system with the identifier of the new file.

* * * * *